United States Patent
Zohar et al.

(12)

(10) Patent No.: US 6,584,935 B2
(45) Date of Patent: Jul. 1, 2003

(54) PROCESS FOR CULTURING CRABS IN RECIRCULATING MARINE AQUACULTURE SYSTEMS

(75) Inventors: Yonathan Zohar, Baltimore, MD (US); Oded Zmora, Baltimore, MD (US); Anson Hines, Severna Park, MD (US)

(73) Assignee: University of Maryland Biotechnology Institute, Baltimore, MD (US)

( * ) Notice: Subject to any disclaimer, the term of this patent is extended or adjusted under 35 U.S.C. 154(b) by 0 days.

(21) Appl. No.: 10/223,551

(22) Filed: Aug. 19, 2002

(65) Prior Publication Data

US 2003/0070624 A1 Apr. 17, 2003

Related U.S. Application Data

(63) Continuation of application No. 09/810,640, filed on Mar. 16, 2001.
(60) Provisional application No. 60/313,142, filed on Aug. 17, 2001.

(51) Int. Cl.$^7$ ............................................. A01K 61/00
(52) U.S. Cl. .................. 119/204; 119/205; 119/211; 119/215; 119/234
(58) Field of Search ............................. 119/204, 205, 119/206, 207, 211, 212, 215, 216, 217, 218, 234, 236

(56) References Cited

U.S. PATENT DOCUMENTS

| | | | |
|---|---|---|---|
| 3,683,853 A | | 8/1972 | Lewis |
| 3,683,854 A | | 8/1972 | Lewis |
| 3,709,195 A | | 1/1973 | Tabb |
| 3,738,317 A | | 6/1973 | Reynolds |
| 4,052,960 A | | 10/1977 | Birkbeck et al. |
| 4,078,521 A | * | 3/1978 | Laubier .................... 119/205 |
| 4,211,183 A | | 7/1980 | Hoult |
| 4,738,220 A | | 4/1988 | Ewald, Jr. |
| 4,910,912 A | * | 3/1990 | Lowrey, III ................ 47/62 R |
| 4,913,093 A | | 4/1990 | VanGorder |
| 5,038,715 A | | 8/1991 | Fahs, II |
| 5,046,451 A | | 9/1991 | Inslee et al. |
| 5,158,037 A | | 10/1992 | Engelbart |
| 5,176,100 A | | 1/1993 | Fujino |
| 5,181,479 A | | 1/1993 | Hiebert |
| 5,216,976 A | | 6/1993 | Marinkovich |
| 5,227,055 A | | 7/1993 | Timmons |
| 5,232,586 A | | 8/1993 | Malone |
| 5,288,705 A | | 2/1994 | Zohar |
| 5,293,839 A | | 3/1994 | Jorgensen |
| 5,466,373 A | | 11/1995 | Handwerker et al. |
| 5,556,536 A | | 9/1996 | Turk |
| 5,643,877 A | | 7/1997 | Zohar |
| 5,718,093 A | | 2/1998 | Tanaka |
| 5,732,654 A | | 3/1998 | Perez et al. |
| 5,762,024 A | | 6/1998 | Meilahn |
| 5,791,290 A | | 8/1998 | Mueller |
| 5,947,057 A | | 9/1999 | Perez et al. |
| 5,961,831 A | | 10/1999 | Lee et al. |
| 6,041,738 A | | 3/2000 | Hemauer et al. |

OTHER PUBLICATIONS

Zohar, Y., Fish Reproduction: Its Physiology and Artificial Manipulation, Chapter 3, Fish Culture in Warm Water Systems: Problems and Trends. Shilo, M. and Sarig, S., eds., CRC Press, Inc., Boca Raton.

Zohar, Y., Doering, D. and Langer, B. 1994. Application of Controlled Release Technology in Aquaculture. Proc. Intern. Symp. Control Rel. Bioact. Mater. 21:110–111.

Powell, J.F.F., Zohar, Y., Elizur, A., Park, M., Fischer, W.H., Craig, A.G., Rivier, J.F., Lovejoy, D.A. and Sherwood, N.M. 1994. Three forms of Gonadotropin–Releasing Hormone Characterized from Brains of One Species. Proc. Natl. Acad. Sci. USA 91:12081–12085.

Zohar, Y., Elizur, A., Sherwood, N.M., Rivier, J.F. and Zmora, N. 1995. Gonadotropin–Releasing Potencies of the Three Native Forms of Gonadtopin–Releasing Hormones Present in the Brain of Gilthead Seabream, Sparus Aurata. Gen. Comp. Endocrinology 97:289–299.

Zohar, Y., Harel, M. Hassin, S. and Tandler, A. 1995. Broodstock Management and Manipulation of Spawning in the Gilthead Seabream, Sparus Aurata. In: Broodstock Management and Egg and Larval Quality (N. Bromage and R.J. Roberts, eds.) pp. 94–117, Blackwell Sci. Press, London.

Mylonas, C.C. 1995. Preparation and Evaluation of Polyanhydride Microspheres Containing Gonadotropin–Releasing Hormone (GnRH), for Inducing Ovulation and Spawning in Fish. Journal of Cont. Rel. 35:23–34.

Mylonas, C.C., Richardson, B.M., Minkinnen, S.P. and Zohar, Y. 1995. Induced Spawning of American Shad (Alosa Sapidissima) Using Sustained Administration of Gonadotropin–Releasing Hormone Analog (GnRHa), Journal of World Aquac. Society 26:240–251.

Hassin, S., Elizur, A., and Zohar, Y. 1995. Molecular Cloning and Sequence Analysis of Striped Bass (Morone Saxatilis) Gonadtropoins I and II Subunits. Journal of Moecular Endocrinology 15:23–35.

(List continued on next page.)

Primary Examiner—Yvonne Abbott
(74) Attorney, Agent, or Firm—Marianne Fuierer; Steven J. Hultquist; Yongzhi Yang

(57) ABSTRACT

The present invention relates to a recirculating marine aquaculture process for production of a crab species, including (i) a broodstock conditioning, (ii) spawning, (iii) egg incubation, (iv) larval growth, (v) nursery post-larval growth, and (vi) grow-out of the crab to a final product weight, in which each stage (i)–(vi) of the process involves operation in an aqueous medium that is coupled in liquid recirculation relationship with waste component removal from the aqueous medium and returning purified aqueous medium to the external environment. The process involves operation in a closed, recirculating aquaculture system in which photoperiod, water temperature, water chemistry, and diet are optimized and then continuously monitored and controlled to obtain optimal production at each of the six phases (i)–(vi) of the life cycle.

18 Claims, No Drawings-

OTHER PUBLICATIONS

Gothilf, Y., Chow., M., Elizur, A., Chen, T.T. and Zohar, Y. 1995. Molecular Cloning and Characterization of a Novel Gonadotropin–Releasing Hormone from Gilthead Seabream. Marine Mol. Biol. Biotechnology 4:27–35.

Zohar, Y. 1996. New Approaches for the Manipulation of Ovulation and Spawning in Farmed Fish. Bull. National Res. Inst. Aquaculture Suppl. 2:43–47.

Mylonas, C.C., Magnus, Y., Gissis, A., Klebanov. Y. and Zohar, Y. 1996. Application in Controlled–Release, GnRHa Delivery Systems in Commercial Production of White Bass X Striped Bass Hybrids (sunshine bass), Using Captive Broodstocks. Aquaculture 140:265–280.

Elizur, A., Zmora, N., Rosenfeld, H., Meiri, I., Hassin, S., Gordin, H. and Zohar, Y. 1996. Gonadotropins beta–GtHI and beta–GtHII from the Gilthead Seabream. Gen. Comp. Endocrinology 102:39–46.

Sorbera, L.A., Mylonas, C.C., Zanuy, S. Carrillo, M., and Zohar, Y. 1996. Sustained Administration of GnRHa Increases Sperm Volume Without Altering Sperm Counts in the Seabass. Journal of Experimental Zoology 276:361–368.

Mylonas, C.C., Woods, L.C., and Zohar, Y. 1997. Cyto–Histological Study of Ovarian Development and Final Oocyte Maturation in Captive–Reared Striped Bass. Journal of Fish Biology 50:34–49.

Mylonas, C.C., Magnus, Y., Gissis, A., and Zohar, Y. 1997. Reproductive Biology and Endocrine Regulation of Final Oocyte Maturation in Captive–Reared White Bass. Journal of Fish Biology 51:234–250.

Mananos, E., Swanson, P., Stubblefield, J. and Zohar, Y. 1997. Purification of Gonadotropin–II from a Teleost Fish, the Hybrid Striped Bass, and Development of a Specific Enzyme–Linked Immunosorbent Assay, Gen. Comp. Endocrinol. 108:209–222.

Mylonas, C.C., Scott, A.P. and Zohar, Y. 1997. Plasma Gonadotropin II, Sex Steroids, and Thyroid Hormones in Wild Striped Bass During Spermination and Final Oocyte Maturation. Gen. Comp. Endocrinology 108:223–236.

Mylonas, C.C., Scott, A.P., Vermeirssen, E.L.M. and Zohar, Y. 1997. Changes in Plasma Gonadotropin II and Sex–Steroid Hormones, and Sperm Production of Striped Bass After Treatment with Controlled–Release Gonadotropin–Releasing Hormone Agonist–Delivery Systems. Biology of Reproduction 57:669–675.

Gothilf, Y., Meiri, I., Elizur, A., and Zohar, Y. 1997. Preovulatory Changes in the Levels of Three Gonadotropin–Releasing Hormone–Encoding Messenger Ribonucleic Acids (mRNAs), Gonadotropin Beta Subunit mRNAs, Plasma Gonadotropin , and Steroids in the Female Gitlhead Seabream, Sparus Aurata. Biology of Reproduction 57:1145–1154.

Hassin, S., Gothilf, Y., Blaise, O., and Zohar, Y. 1998. Gonadotropin–I and II Subunit Gene Expression of the Male Striped Bass After Gonadotropin–Releasing Hormone Analog Injection: Quantitation Using an Optimized Ribonuclease Protection Assay. Biology of Reproduction 58:1233–1240.

Mylonas, C.C., Woods, L.C., Thomas, P. and Zohar, Y. 1998. Endocrine Profiles of Female Striped Bass During Post–Vitellogenesis and Induction of Final Oocyte Maturation and Spawning Using Controlled–Release GnRH–Delivery System. Gen. Comp. Endocrinology. 110:276–289.

Holland, M.C., Hassin, S. and Zohar, Y. 1998. Effects of Long–Term Testosterone, Gonadotropin–Releasing Hormone Agonist and Pimozide Treatments on Gonadotropin–II Levels and Ovarian Development in Juvenile Striped Bass. Biology of Reproduction 59:1153–1162.

Holland, M.C.H., Gothlif, Y., Meiri, I., King, J.A., Okuzawa, K., Elizur, A. and Zohar, Y. 1998. Levels of the Native Forms of GnRH in the Pituitary of the Gilthead Seabream, Sparus Aurata, at Several Characteristics Stages of the Gonadal Cycle. Gen. Comp. Endocrinology 112:394–405.

Chow, M.M., Kight, K.E., Gothilf, Y., Alok, D., Stubblefield, J. and Zohar, Y. 1998. Multiple GnRHs Present in a Teleost Species are Encoded b Separate Genes: Analysis of the sbGnRH and cGnRH–II Genes from the Striped Bass, Morone Saxatilis. Journal of Mol. Endocrinology 21:277–289.

Hassin, S., Holland, M.C.H., and Zohar, Y. 1999. Ontogeny of Follicle–Stimulating Hormone and Luteinizing Hormone Gene Expression During Pubertal Development in the Female Striped Bass, Morone Saxatilis. Biology of Reproduction 414:1608–1615.

Holland, M.C., Hassin, S. and Zohar, Y. 2000. Gonadal Development and Plasma Steroid Levels During Pubertal Development in Captive–Reared Striped Bass, Morone Saxatilis. Journal of Experimental Zoology 286:49–63.

Munoz–Cueto, J.A, Zohar, Y. and Kah, O. 2000. Brian Atlas of the Gilthead Seabream (Sparus Aurata), Sea Grant Press.

Raloff, J., "Downtown Fisheries? Advances May Make Fish Farming a Healthy Prospect, Even for Inner Cities," Science News, vol. 157, No. 20, May 13, 2000, pp. 314–316.

Bead Filter Catalog, 1998, Aquaculture Systems Technologies, LLC, P.O. Box 15827, New Orleans, LA 70175–0827.

* cited by examiner

PROCESS FOR CULTURING CRABS IN RECIRCULATING MARINE AQUACULTURE SYSTEMS

CROSS-REFERENCE TO RELATED APPLICATIONS

This application claims priority from U.S. Provisional Patent Application No. 60/313,142 filed on Aug. 17, 2001 and is a continuation-in-part of U.S. patent application Ser. No. 09/810,640 filed on Mar. 16, 2001 in the names of Yonathan Zohar, Stan Serfling, John Stubblefield, Mordechai Harel and Alan Place for "RECIRCULATING MARINE AQUACULTURE PROCESS."

BACKGROUND OF THE INVENTION

1. Field of the Invention

The present invention relates to culturing marine species, and more particularly, to culturing crabs in a recirculating marine aquaculture process.

2. Description of Related Art

In recent years the world has witnessed an alarming decline in commercial fisheries, the result of over fishing and environmental degradation. According to the Food and Agriculture Organization (FAO) of the United Nations, nearly 70% of the world's commercial marine fisheries species are now fully exploited, overexploited or depleted.

Based on anticipated population growth, it is estimated that the world's demand for seafood will double by the year 2025. Therefore, a growing gap is developing between demand and supply of fisheries products, which results in a growing seafood deficit. Even the most favorable estimates project that in the year 2025 the global demand for seafood will be twice as much as the commercial fisheries harvest.

The same trend is present in the U.S. per capita consumption of seafood by Americans that increased 25% from 1984 to 1994, and continues to increase. As a result, the United States has become highly dependent on imported seafood. The U.S. is, after Japan, the world's largest importer of seafood. The value of fish imports increased by nearly 80% between 1985 and 1994 to a record level of nearly $12 billion U.S. This has resulted in a trade deficit of $7 billion U.S. for edible seafood, which is, after petroleum, the largest contributor to the U.S. trade deficit among natural products and the largest deficit among all agricultural products.

It is very clear that the only way to meet the world's growing needs in fisheries products, and to reverse the U.S. fisheries trade deficit, is through marine aquaculture systems—the farming of aquatic organisms in controlled environments. In response to the situation, global aquaculture production is expanding quickly. Aquaculture's contribution to the world's seafood supplies increased from 12 to 19% between 1984 and 1994. U.S. aquaculture production has also grown steadily in the 1980's and 1990's and it is the fastest growing agricultural industry. However, despite the recent growth of the U.S. industry, only 10% of the seafood consumed in the U.S. comes from domestic aquaculture, and the U.S. ranks only tenth in the world in the value of its aquaculture production.

Worldwide, it is estimated that in order to close the increasing gap between demand and supply of aquatic products, aquaculture will need to increase production three-to-four-fold during the next two and a half decades. In this context, there is a compelling motivation to develop aquaculture systems of improved and commercially viable character for high volume production of aquatic species and environmental sustainability.

Crab fisheries have been an important part of local and regional economies for generations. Notable examples are the blue crab (*Callinectes sapidus*) in the Chesapeake Bay region, the Alaskan (red) King crab (*Paralithodes camtschatica*) in the Bristol Bay region of the Bering Sea, and the various Cancer crab species (i.e., the Dungeness crab, *Cancer magister*, the Jonah crab, *C. borealis* and the Rock crab, (*C. irraoratus*) along the Pacific coast of the United States. As with many marine species, most of these crab fisheries exhibit severe fluctuations in stock abundance and, correspondingly, their respective harvest.

The culture of some of the above species, such as Callinectes and Cancer species, has been previously investigated, but not actively undertaken. For the most part, culture of these crabs species has been discounted because of a variety or reasons including complex and multiple larvae stages, cannibalism during juvenile stages, slow growth rate to market size and the impracticality of relying on wild-caught broodstock. In addition, environmental considerations e.g., discharge of environmentally-disruptive effluents, or limitations on culture because of environmental regulations, have probably discouraged development of commercial facilities.

With depleted crab resources worldwide, most notably the recent decline of the Chesapeake bay blue crab stock and harvests, and increased fishing efforts on the dwindling crab fisheries, it is critical to ensure the long-term sustainability of the various crab species and the local crab industries they support.

With the many challenges to blue crab reproduction and larval growth in the wild, it is clear that new approaches must be explored to ensure the viability of the blue crab resource. Given the difficulty-and often impossibility-of controlling environmental factors, it is necessary to research and develop ways to spawn and nurture blue crabs in captivity that can be released into the Chesapeake Bay when they are capable of surviving on their own. Additionally the captive culture of blue crab for commercial consumption should be reinvestigated. Especially, in order to meet current market demand, and hopefully, decrease current fishing pressure on this species. It should be noted that other research institutes (e.g., Australia's Bribie Island Aquaculture Research Center) are exploring hatcheries for different crab species such as the mud crab (*Scylla serrata*), but these studies are focused in open pond environments as opposed to inside a highly controllable, predictable, and reliable closed-loop environment.

Given the increasing state and federal regulation of natural fisheries and the aquaculture industry, and the increasing demand for crabmeat, it is important for crab-producing states to develop competitive and sustainable crab aquaculture capabilities. Although aquaculture is still a relatively new industry in this country, it is increasing in importance and has the potential for major growth in the 21st century.

In an effort to eliminate the effects of marine aquaculture on the environment and to optimize aquaculture production, a new environmentally acceptable aquatic farming technology has recently emerged: the use of recirculated marine aquaculture systems (RMAS), in which the same water is continuously reused in operation of the system. These systems have many advantages over non-recirculating systems.

Water re-use in the RMAS minimizes any adverse environmental burden created by the aquaculture system since there is minimal net waste material generation, and what waste is generated is easily handled by local sewer systems. RMAS offer flexibility in location options (urban, rural, inland) since they are not confined to coastal areas or open oceans. Unlike free-floating pens, process conditions can be better controlled within a RMAS.

In general, aquaculture systems of the prior art are poorly integrated in respect of the life stages of the aquatic species of interest and the process conditions associated therewith. As a result, the commercial aquaculture systems developed to date are highly variable in efficiency and output of product. Such systems are subject to numerous processing and operational deficiencies, including: sub-optimal production of fish; absence of control of process conditions; process instability; susceptibility to environmental pathogens; susceptibility to pollution; loss of stock; and the lack of well-defined optimal conditions for achieving maximal growth and production of the aquatic species being raised in the aquaculture system.

There is therefore a basic need in the art of aquatic farming, especially for culturing crabs for aquaculture systems of improved character, for high performance production of crabs.

In respect of the present invention, as hereinafter more fully described, the following references are noted, and their disclosures hereby incorporated herein by reference:

U.S. Pat. No. 5,176,100 to Fujino (biofiltration aquarium systems utilizing microbial growth on plastic substrate elements for metabolic waste removal);

U.S. Pat. No. 5,227,055 to Timmons (closed cycle aquaculture system including a rotating biological contactor);

U.S. Pat. No. 5,038,715 to Fahs, II (enclosed aquaculture system comprising progressively larger tanks connected in series to accommodate fish growth);

U.S. Pat. No. 5,718,093 to Reese et al. (aquaculture vessel with recirculating open-cell foam media for aeration and waste removal);

U.S. Pat. Nos. 5,732,654 and 5,947,057 to Perez et al. (marine culture system including activated carbon treatment enabling use of polluted source water);

U.S. Pat. No. 5,232,586 to Malone (hourglass-shaped biofilter containing floating media supporting biofloc and nitrifying bacteria);

U.S. Pat. No. 4,211,183 to Hoult (open system including a biological water filter, and removal of sludge from bacterial mat, for growth of fish to marketable size);

U.S. Pat. No. 5,762,024 to Meilahn (pump-equipped floating tank aquaculture system for pump-mediated displacement of water, to remove nitrogen wastes and introduce oxygen);

U.S. Pat. No. 6,041,738 to Hemauer et al. (fish pond including deepened central region, in combination with a settling pond and a decomposition pond for biological decomposition of wastes by plants);

U.S. Pat. No. 5,556,536 to Turk (anaerobic bacterial denitrification of fluids, e.g., in aquaculture systems);

U.S. Pat. No. 5,293,839 to Jorgensen (aquaculture tank with liquid level-responsive siphon/suction unit for waste removal);

U.S. Pat. No. 4,738,220 to Ewald, Jr. (fish farm and hatchery system with comparted tankage for brood fish retention, fertilized egg collection, fish feed cultivation and grow-out);

U.S. Pat. No. 5,046,451 to Inslee et al. (fish farm and hydroponic greenhouse system with intercirculation between fish tank and hydroponic network);

U.S. Pat. No. 5,466,373 to Handwerker et al. (biofilter using amphipods, e.g., *Hyalella azteca*);

U.S. Pat. No. 3,709,195 to Tabb (floating fish pens for open sea use);

U.S. Pat. No. 3,738,317 to Reynolds (egg trays for growth of fresh water fish species);

U.S. Pat. No. 3,683,853 to Lewis (fish egg incubator suspended in a body of water by a buoyant collar);

U.S. Pat. No. 5,791,290 to Mueller (a fish larval incubator with skimmer, gas controller and waste evacuation means);

U.S. Pat. No. 5,181,479 to Hiebert (fish eggs/larvae collection/preservation system);

U.S. Pat. No. 3,683,854 to Lewis (device by which fertilized eggs are transported over a barrier into a holding container, thereby separating viable from non-viable eggs);

U.S. Pat. No. 5,961,831 to Lee et al. (automated aquaculture system including biofilters, video monitoring, ultraviolet radiation/ozonation purification);

U.S. Pat. No. 4,052,960 to Birkbeck et al. (fish rearing system with filtration/ozonation treatment of recycling water);

U.S. Pat. No. 5,158,037 to Engelbart (aquaculture system including aerated breeding pond, sludge settling pond and algae-pool);

U.S. Pat. No. 4,913,093 to VanGorder (multi-tank culturing method in which fish population in a tank is subdivided and each resultant subpopulation is introduced to a separate tank of a corresponding number of additional tanks, as population equals or exceeds tank capacity);

U.S. Pat. No. 5,216,976 to Marinkovich (domed aquaculture chamber overlying body of water that is heated with bubbled air for growth of non-native post-larval organisms);

U.S. Pat. No. 5,643,877 and U.S. patent application Ser. No. 08/912,314 to Zohar et al. (method of fish spawning promotion by administration of a peptide of the formula pGlu-His-Trp-Ser-Tyr-$R_6$-Leu-X-Pro-$R_{10}$-NHR, as defined in such patent);

U.S. Pat. No. 5,288,705 to Zohar (manipulation of fish ovulation and spawning by administration of gonadotropin-releasing hormone (GnRH), luteinising releasing hormone (LHRH) and analogs, in a polymer based sustained release delivery system);

Zohar, Y., "Fish Reproduction: Its Physiology and Artificial Manipulation," Chapter 3, Fish Culture in Warm Water Systems: Problems and Trends, Shilo, M. and Sarig, S., eds., CRC Press, Inc., Boca Raton;

Bead Filter Catalog, 1988, Aquaculture Systems Technologies, LLC, P.O. Box 15827, New Orleans, LA 70175-0827;

Zohar, Y., Doering, D and Langer, B. (1994), Application of controlled release technology in aquaculture, Proc. Intern. Symp. Control. Rel. Bioact. Mater. 21: 110–111;

Powell, J. F. F., Zohar, Y., Elizur, A., Park, M., Fischer, W. H., Craig, A. G., Rivier, J. F., Lovejoy, D.A. and Sherwood, N. M. (1994), Three forms of gonadotropin-releasing hormone characterized from brains of one species, Proc. Natl. Acad. Sci. USA 91: 12081–12085;

Zohar, Y., Elizur, A., Sherwood, N. M., Rivier, J. F. and Zmora, N. (1995), Gonadotropin-releasing potencies of the three native forms of gonadotropin-releasing hormones present in the brain of gilthead seabream, *Sparus aurata*, Gen. Comp. Endocrinol. Gen. Comp. Endo. 97: 289–299;

Zohar, Y., Harel, M., Hassin, S. and Tandler, A. (1995), Broodstock management and manipulation of spawning in the gilthead seabream, Sparus aurata. In: "Broodstock Management and Egg and Larval Quality" (N. Bromage and R. J. Roberts, eds.) pp 94–117, Blackwell Sci. Press., London;

Mylonas, C. C., Tabata, Y., Langer, R. and Zohar, Y. (1995), Preparation and evaluation of polyanhydride microspheres containing gonadotropin-releasing hormone (GnRH), for inducing ovulation and spawning in fish, J. Cont. Rel. 35: 23–34;

Mylonas, C. C., Richardson, B. M., Minkinnen, S. P. and Zohar, Y. (1995), Induced spawning of American shad (Alosa sapidissima) using sustained administration of gonadotropin-releasing hormone analog (GnRHa), J. World Aquac. Soc. 26: 39–50;

Hassin, S., Elizur, A. and Zohar, Y. (1995), Molecular cloning and sequence analysis of striped bass (Morone saxatilis) gonadotropins I and II subunits, J. Mol. Endocrinol. 15: 23–35;

Gothilf, Y., Chow M., Elizur, A., Chen, T. T. and Zohar, Y. (1995), Molecular cloning and characterization of a novel gonadotropin-releasing hormone from gilthead seabream (Sparus aurata), Marine Mol. Biol. Biotech. 4: 27–35;

Zohar, Y. (1996), New approaches for the manipulation of ovulation and spawning in farmed fish, Bull. Natl. Res. Inst. Aquacult. Suppl. 2: 43–47;

Mylonas, C. C., Magnus, Y., Gissis, A., Klebanov, Y. and Zohar, Y. (1996), Application of controlled-release, GnRHa delivery systems in commercial production of white bass x striped bass hybrids (sunshine bass), using captive broodstocks, Aquaculture: 140: 265–280;

Elizur, A., Zmora, N., Rosenfeld, H., Meiri, I., Hassin, S., Gordin, H. and Zohar, Y. (1996), Gonadotropins beta-GtHI and beta-GtHII from the gilthead seabream, Sparus aurata, Gen. Comp. Endocrinol., 102: 39–46;

Gothilf, Y., Munoz-Cueto J. A., Sagrillo, C. A., Selmanoff, M., Chen, T. T., Kah, O., Elizur, A. and Zohar, Y. (1996), Three forms of gonadotropin-releasing hormone in a perciform fish (Sparus aurata): cDNA characterization and brain localization, Biol. Repro. 55: 636–645;

Sorbera, L. A., Mylonas, C. C., Zanuy, S., Carrillo, M. and Zohar, Y. (1996), Sustained administration of GnRHa increases sperm volume without altering sperm counts in the seabass (Dicentrarchus labrax), J. Exp. Zool. 276: 361–368;

Mylonas, C. C., Woods, L.C. and Zohar, Y. (1997), Cyto-histological study of ovarian development and final oocyte maturation in captive-reared striped bass, J. Fish Biol. 50: 34–49;

Mylonas, C. C., Magnus, Y., Gissis, A., and Zohar Y. (1997), Reproductive biology and endocrine regulation of final oocyte maturation in captive-reared white bass (Morone chrysops), Journal of Fish Biology, 51: 234–250;

Mananos, E., Swanson, P., Stubblefield, J. and Zohar, Y. (1997), Purification of gonadotropin-II from a teleost fish, the hybrid striped bass, and development of a specific enzyme-linked immunosorbent assay, Gen. Comp. Endocrinol. 108: 209–222;

Mylonas, C. C., Scott, A. P. and Zohar, Y. (1997), Plasma gonadotropin II, sex steroids, and thyroid hormones in wild striped bass (Morone saxatilis) during spermiation and final oocyte maturation, Gen. Comp. Endocrinol. 108: 223–236;

Mylonas, C. C., Scott, A.P., Vermeirssen, E. L. M. and Zohar, Y. (1997), Changes in plasma gonadotropin H and sex-steroid hormones, and sperm production of striped bass after treatment with controlled-release gonadotropin-releasing hormone agonist-delivery systems, Biol. Reprod. 57: 669–675;

Gothilf, Y., Meiri, I., Elizur, A. and Zohar, Y. (1997), Preovulatory changes in the levels of three gonadotropin-releasing hormone-encoding messenger ribonucleic acids (mRNAs), gonadotropin beta subunit mRNAs, plasma gonadotropin, and steroids in the female gilthead seabream, Sparus aurata, Biol. Repro. 57: 1145–1154;

Hassin, S., Gothilf, Y., Blaise, O., and Zohar, Y. (1998), Gonadotropin-I and-II subunit gene expression of the male striped bass after gonadotropin-releasing hormone analog injection: quantitation using an optimized ribonuclease protection assay, Biol. Reprod. 58: 1233–1240;

Mylonas, C. C., Woods, L. C., Thomas, P. and Zohar, Y. (1998), Endocrine profiles of female striped bass (Morone saxatilis) during post-vitellogenesis and induction of final oocyte maturation and spawning using controlled-release GnRH-delivery systems, Gen. Comp. Endocrinol. 110: 276–289;

Holland, M. C., Hassin, S. and Zohar, Y. (1998), Effects of long-term testosterone, gonadotropin-releasing hormone agonist and pimozide treatments on gonadotropin-II levels and ovarian development in juvenile striped bass, Biol. Reprod. 59: 1153–1162;

Holland, M. C. H., Gothilf, Y., Meiri, I., King, J. A., Okuzawa, K., Elizur, A. and Zohar, Y. (1998), Levels of the native forms of GNRH in the pituitary of the gilthead seabream, Sparus aurata, at several characteristic stages of the gonadal cycle, Gen. Comp. Endocrinol. 112: 394–405;

Chow, M. M., Kight, K. E., Gothilf Y., Alok D., Stubblefield, J. and Zohar, Y. (1998), Multiple GnRHs present in a teleost species are encoded by separate genes: Analysis of the sbGnRH and cGnRH-II genes from the striped bass, Morone saxatilis, J. Mol. Endo. 21: 277–289;

Hassin, S., Holland, M. C. H. and Zohar, Y. (1999), Ontogeny of follicle-stimulating hormone and luteinizing hormone gene expression during pubertal development in the female striped bass, Morone saxatilis (Teleosti), Biol. of Reprod. 414: 1608–1615;

Holland, M. C., Hassin, S. and Zohar, Y. (2000), Gonadal development and plasma steroid levels during pubertal development in captive-reared striped bass, Morone saxatilis, J. Exp. Zool. 286:49–63;

Munoz-Cueto J. A, Zohar, Y. and Kah O. (2000), Brain Atlas of the gilthead seabream (Sparus aurata), Sea Grant Press. (In press);

Raloff, J., "Downtown Fisheries? Advances may make fish farming a healthy prospect, even for inner cities," Science News, Vol. 157, No. 20, May 13, 2000, pp. 314–316; and Stickney, Robert R., editor (2000), Encyclopedia of Aquaculture, pp. 177–180, New York, Wiley.

SUMMARY OF THE INVENTION

The present invention relates to aquaculture production of a marine species in a recirculating marine aquaculture process system for achieving optimal yield of the marine species at variable density grow-out conditions. Preferably, the marine species is a crustacean including, but not limited to, crayfish, crabs, lobster and shrimp.

As used herein, the term "regime" refers to concurrent changes of parameters of the process (e.g., photoperiod, temperature, salinity, dissolved oxygen, population density). Such concurrent changes of process parameters are employed to achieve a regulated process in specific stages or steps of the aquaculture process.

The closed, recirculating marine aquaculture process of the invention involves simultaneous manipulation and then continuous monitoring and control of three key process factors: (1) photoperiod, (2) water temperature, and (3) water chemistry (salinity, dissolved oxygen (DO), ozone level, pH, etc.). For each species of crab, these process conditions are manipulated/tailored to achieve optimal performance.

In accordance with one aspect of the invention, distinct process conditions are applicable to a specific crab species including changing photoperiod (light exposure) conditions according to the spawning and lifecycle of the crab.

In another aspect, the invention relates to a recirculating marine aquaculture process for production of a crab species, including (i) crab broodstock conditioning, (ii) spawning, (iii) egg incubation, (iv) larval growth, (v) nursery post-larval growth, and (vi) grow-out of crab to a final product weight, in which each stage (i)–(vi) of the process involves operation in an aqueous medium that is coupled in liquid recirculation relationship with means for removing waste components from the aqueous medium and returning purified aqueous medium to the external environment. The process involves operation in a closed, recirculating aquaculture system in which photoperiod, water temperature, water chemistry, and diet are optimized and then continuously monitored and controlled to obtain optimal production at each of the six phases (i)–(vi) of the life cycle.

The process includes the steps of:

providing recirculated aqueous media tanks for populations in the life-cycle stages for crab production;

optionally administering, as needed, gonadotropin-releasing hormone or GNRH agonist to a broodstock population of the crabs prior to spawning;

continuously recirculating aqueous medium and treating the aqueous medium for removal of waste therefrom;

maintaining process conditions in said aqueous media for the life-cycle stages in accordance with PROCESS CONDITIONS correlative to LIFE-CYCLE STAGE in Table A below:

TABLE A

| LIFE CYCLE STAGES | PROCESS CONDITIONS | |
|---|---|---|
| Broodstock conditioning | Salinity: | 15 ppt–35 ppt (optimal 30 ppt) |
| | Temperature: | 15–25° C. (optimally water temperature is kept at approximately 20° C. until females develop an egg mass (sponge) Temperature is then increased to approximately 22° C. to expedite the progression of egg development.) |
| | Dissolved O$_2$ (DO): | 80% to 100% saturation (optimal 100%) |
| | ORP | 96–498 mV |
| | Population | 4–7 crabs/meter$^2$ of tank bottom |

TABLE A-continued

| LIFE CYCLE STAGES | PROCESS CONDITIONS | |
|---|---|---|
| | Density: | surface area (density is largely based on aggression factors, not biomass per tank volume) (optimal 4 crabs/meter$^2$) |
| | Photoperiod and Thermal Regimes | simulated natural photoperiod and thermal regimes simulating natural environmental conditions including increasing days of 12–15 hr light and 9–12 hr dark with transition between light and dark periods of 45 minutes to 1 hour and 15 minutes: (See also "additional considerations" below for information on photoperiod shifting.) |
| | Diet: | Crabs are fed 1–3 times daily with 2% per kg body weight, (50% chopped squid, 50% pelleted diet designed for bottom feeders). Diet is water stable for 24 hours; examples of suitable dietary compositions are dry pellets squid meal-based composed of 50–55% protein and 10–15% marine-type lipid. The lipids contain at least 5% n-3 highly unsaturated fatty acids (HUFA), mainly of the 22:6n-3 [DHA] type. Alternatively, crabs may be fed 1–1.5% per kg of body weight of dry commercial pellets (e.g., trout pellets, supplemented with beneficial fatty acids) or other live/frozen diets (e.g., chopped fish, mollusks or crustaceans) |

Additional considerations:

1. Mated female crabs collected from the wild, or captive-born females that have mated in captivity are used as broodstock. Individual crabs are marked with numbers cemented to the dorsal carapace. The crabs are stocked in tanks 2–12 cubic meters, at the densities discussed above. The tank bottoms preferably are coated with a fine grain sand. Alternatively, a "sand box" (1 box/female) filled with fine grain sand, preferably aerated, is made available for females to develop a sponge.

2. Wild caught crabs, including sponge crabs, are immersed in a 20 ppm formalin bath for 15–20 minutes. The sponge is then sprayed with an iodine solution. This disinfection treatment can be repeated when needed for several days. This treatment can also be used on captive born animals (juveniles and adults) as a general preventative treatment or in response to specific pathogens.

3. Mature females (i.e., females that have undergone the terminal molt) collected in the Fall season (e.g., September) are presumed to be mated and storing a spermatophore (sperm packet). No verification of mating/sperm storage is conducted on live animal (no know method), but post-mortem dissection of broodstock females has confirmed that all studied animals have been mated females with developing gonads.

4. In order to obtain out-of-season spawning, the tanks should be either indoors or covered to allow photoperiod, temperature, and salinity manipulation. By manipulating the environment eggs/larvae can be obtained all year round.

(Example: Crabs collected in September and held in a simulated environment of

TABLE A-continued

| LIFE CYCLE STAGES | PROCESS CONDITIONS | |
|---|---|---|
| | | "spring" photoperiod (i.e., photoperiod which increases daily toward approximately 14 hours light/day) produced fertilized eggs and viable larvae by mid-late January, six months ahead of the natural spring reproductive season). |
| | | 5. Tank systems are completely contained, recirculating systems with full environmental control. Environmental regimes are programmable via a computer software program. |
| | | 6. The following water treatment technologies are a part of the life support process: solid removal filter (sand, bead, screen/drum, etc.) for solids removal and clarification down to 20 microns, biofilters for nitrogen removal. |
| | | 7. Various methods are available to mark/tag individual crabs for record-keeping purposes. Sample methods include injecting elastomers (colored rubber-based markers) into the muscle and gluing numbered tags onto the carapace with clear epoxy. |
| | | 8. Fine-grade sand is provided in the tank system as a habitat medium for broodstock crabs. Sand can be placed directly on the tank bottom or preferably placed in walled containers, i.e., an open plastic box. |
| | | 9. Pre-molt crabs can be identified by a thin white, pink or red line on the inside edge of the swimming paddles. Pre-molt crabs can be segregated and held in cyclical cage system reference below until shedding occurs. |
| Spawning egg release | Salinity: Temperature: Dissolved O$_2$ (DO): Population density: Photoperiod regime: | 20–35 ppt (optimal 30 ppt) 15–25° C. (optimal 22° C.) 80%–100% saturation 1 female/tank (90 gallon)

increasing days of 12–15 hours of light and 9–12 dark with transitions between light/dark periods of 45 minutes to 1 hour and 15 minutes; conditions culminate in photoperiod simulating natural spawning conditions of April–May.
Additional Considerations:

1. Sponge (egg) development is monitored by viewing the color of the sponge (i.e., orange versus blackish) according to the methods of Bland and Amerson (1974). A sample of eggs is periodically removed from the sponge with a small scissors or tweezers and assessed under the microscope. Ovigerous females are moved into an individual spawning tank, with an attached larvae collection tank if needed, when their sponge becomes changes from orange to a dark or blackish color. For convenience, females may be contained within a mesh cage that will allow liberated eggs/larvae to move freely into the main volume of the spawning tank. After release of her brood, the spent adult female is returned to the broodstock tank. Alternatively, larvae can be collected in an attached larval collection tank. Eggs/larvae are typically released within 48–72 hours after segregation. Larvae release from the sponge may occur at different times of the day. Typically, release of the sponge contents occurs over a period of 1–3 days at 22° C. water temperature. |
| | | 2. Enriched rotifers are introduced at approximately 40 individuals/ml into the releasing tank approximately 24 hours before release (when the sponge is black and embryonic heartbeats are visible under a microscope), as larvae are usually released at night and start to feed immediately. |
| | | 3. Alternatively, an attached larval collection tank is connected to the spawning tank and shares the same water filtration system. Larvae are suspended in the water column and moved to the collection tank via an overflow pipe. The larvae collection tank has specially design screens (about 250 micron) over the effluent pipe, thus preventing the movement of larvae out of the collection tank. |
| Egg Incubation | Salinity: Temperature: Dissolved O$_2$ (DO): Photoperiod regime: Notes: | 26–33 ppt (optimal 30 ppt) 18–25° C. (optimal 22° C.) 80% to 100% saturation (optimal 100%)

no photoperiod requirement

Unless physically removed (stripped) from the female's body, egg incubation takes place with eggs attached to the female crab. Removal of the developing egg mass from the female is sometimes performed when the health of the brooding female is deteriorating, or to conduct multi-treatment experimental trials on a single brood during incubation. |
| Larval crab rearing | Salinity: Temperature: Dissolved O$_2$ (DO): Population Density: Photoperiod regime: Diet and Green Water Environment: | 26–33 ppt (optimal 30 ppt) 18–25° C. (optimal 22° C.) 80% to 100% saturation 30–175 larvae/liter (optimal 100 larvae/liter) simulated natural regime enriched rotifers followed by enriched artemia as follows: After hatching/release from sponge, larvae are offered enriched rotifers (*B. rotundiformis*) enriched for 8 hr with n3/n6 enrichment media, and algae (a combination of Tetraselmis, Isochrysis and Nannochloropsis sp.), at a concentration of 40 rotifers/milliliter and 2.5 mg dry wt/L, respectively of the combined cocktail. The concentration of both rotifers and algae is maintained by continuous addition of both by hand. Continuous addition of rotifers via a continuous dispensing system (e.g., a gravity-based dispenser or dosing pump) can also be done. Once larvae become stage 3 zoea, the larvae are offered newly hatched Artemia nauplii in addition rotifers. One day later, they are offered nauplii enriched for 16 hr with n3/n6 enrichment media (a total of 70–800 Artemia/L). When the larvae reach age 8, they are counted and transferred to the nursery, where they are fed enriched adult Artemia. A stage-specific feeding schedule is listed below: |

TABLE A-continued

| LIFE CYCLE STAGES | PROCESS CONDITIONS | |
|---|---|---|
| | | zoea III and all subsequent stages: fresh nauplii of Artemia; zoea IV and all subsequent stages: fresh and enriched nauplii and Cyclopeeze (a commercial copepod-based diet) and some artificial replacement diets; and Megalopa stage and early juvenile stages: early stages of Artemia through adult stage of Artemia. |
| | Notes: | Larvae are released from the sponge on successive days (usually over a 1–3 day timeframe at 22° C.) in average 800–3000 larvae per liter (approximately total release is 1,000,000–1,200,000 larvae). Larvae are placed in 1000 liter hatching tanks at approximately 100,000 larvae/tank. |
| Nursery (nursery stage defined as 50 mg to 5 g body weight) | Salinity: | 12–30 ppt |
| | Temperature: | 15–28° C. |
| | Dissolved O$_2$ (DO): | 80% to 100% saturation (optimal 100%) |
| | Population density | 4–10 post-larvae/liter, estimated maximum density of 6000 individuals per cubic meter volume |
| | Photoperiod regime: | light exposure simulative of a natural wild environment. |
| | Diet: | early stage of Artemia through adult stages of Artemia, enriched Artemia, frozen seafood, and a combination of artificial diets, including pelleted and flake food. |
| | Notes: | 1. Juvenile crabs are maintained with an ample habitat to minimize aggressive behavior. Examples of habitat include PVC pipe, artificial algae (e.g., Aquamats or a plastic seaweed-shaped substrate), plastic mesh screens, sand and others. 2. Juvenile crabs are graded periodically on an "as needed" basis to segregate the population into compatible size classes. Grading is typically conducted by hand-picking individuals from nursery and grow-out tanks and relocating them to tanks designated according to predetermined carapace size ranges (e.g., less than 20 millimeters, 20–30 millimeters, etc.) |
| Grow-out | Salinity: | 20–30 ppt (optimal 28–30 ppt) |
| | Temperature: | 10–30° C. (optimal 22° C.) |
| | Dissolved O$_2$ (DO): | 80% to 100% saturation (optimal 100%) |
| | Population density: | 400–800 juveniles per 200 liter tank: variable density depending on aggression factors, optimally animals are isolated into individual cages |
| | Water exchange: | about 0.5 to about 5 environment volumes/day dependent on the number of crabs in the tank, temperature and feeding regime; a flow-through system or closed loop recirculating systems can be used |
| | Photoperiod regime: | 15–17 hours of light per day (optimal 15 hours light) |
| | Feeding: | 1–3 times/day of pelleted commercial diet, with crab fed approximately 2–25% of their body weight. The percentage of feed/body weight decreases as crabs increase in size. |
| | pH: | 7.4–7.8 |
| | Notes: | 1. Juvenile crabs are maintained with ample habitat to minimize aggressive behavior. Examples of habitat include PVC pipe, artificial algae (Aquamats or a plastic seaweed-shaped substrate), plastic mesh screens, sand and others. 2. Juvenile crabs are moved to individual cells as they increase in size and aggressiveness. A cyclical cage system (The Green Solution, Aquatic Systems, Ltd., Kfar Hess, Israel) may be used for grow-out. The system is composed of adjustable-size, 5 millimeter mesh compartments, arranged around two cylindrical, horizontal drums/wheel that rotate at preselected, programmable internals. As individual rows rotate to the top position, an automatic programmable feed dispensing system (suspended on a track over the tank system) drops pelleted food uniformly into each of the compartments. 3. Alternatively, standard tank systems (e.g., round 650 gallon tanks) can be used provided that significant shelter is available to the crabs. 4. Juvenile crabs are graded periodically on an "as needed" basis to segregate into compatible size classes. 5. The above discussed cyclical cage system can be used for pre-molt crabs until shedding occurs and the freshly molted crabs can be removed from the tank for marketing. |

In another aspect, the invention relates to a process for producing a crab species, by cultivation in life-cycle stages including broodstock conditioning, spawning, egg incubation, larval rearing, nursery processing, and grow-out, in a continuous recirculation aquaculture system adapted to culture corresponding populations of broodstock, eggs, larvae, and crabs in aqueous media, wherein photoperiod, water temperature, water chemistry, and diet are optimally maintained in the life-cycle stages to achieve optimal production in such life-cycle stages.

Water may be supplied for the process from a municipal water supply following de-chlorination treatment, e.g., by contacting the municipal water with activated carbon sorbent, to constitute the aqueous medium for the broodstock conditioning, spawning, egg incubation, larval rearing, nursery processing, and grow-out life-cycle stages.

Another aspect of the invention relates to a process of grow-out of a crab species in an aqueous medium, including the steps of:

(a) culturing the crab species in a culture tank coupled in liquid recirculation flow relationship with a biofilter and mechanical filter maintained under aerobic microbial conditions;

(b) continuously circulating aqueous medium through the culture tank and the biofilter and mechanical filter coupled therewith, to remove nitrogenous wastes and solids from the aqueous medium and produce a filtered aqueous medium for recirculation to the culture tank;

(c) maintaining a circulation rate of the continuously circulating aqueous medium producing from about 0.5 to about 5 volumetric changes of the culture tank per day;

(d) maintaining dissolved oxygen at about 80% to about 100% saturation in the aqueous medium in the culture tank;

(e) exposing grown out crabs in the culture tank aqueous medium to a photoregime whose light period substantially exceeds duration of light exposure in a wild marine environment; and (f) utilizing a hyposaline aqueous medium as the aqueous medium.

Yet another aspect of the invention relates to a method of producing a crab species in a recirculating aquaculture system comprising:

(i) respective aqueous medium-containing tanks for successive life-cycle stages of the crab species including broodstock conditioning, spawning, egg incubation, larval rearing, nursery processing, and crab grow-out, and (ii) filtration means coupled in closed loop aqueous medium recirculation relationship with the respective tanks, so that aqueous medium from a tank is filtered for purification thereof and returned to the tank.

In such process, growth conditions are maintained in each of the respective tanks by the steps of:

(a) administering nutritive material to each of the respective tanks containing the crab or crab precursor feeding species;

(b) maintaining salinity, dissolved oxygen, pH, temperature and photoexposure within predetermined ranges in each of the respective tanks;

(c) utilizing a hyposaline aqueous medium as the aqueous medium in the grow-out tank; and (d) optionally administering, as needed, gonadotropin-releasing hormone (GnRH) or GnRH agonist (GnRHa) to the crab species in a sustained release form prior to spawning of the crab species in the spawning tank.

With respect to the optional administration of GnRH or GnRHa for enhancement of spawning capabilities, it will be appreciated that aquatic species will vary substantially in their need for, and response to, such hormonal treatment, and that some marine species may not require any such augmentive treatment for carrying out spawning in an optimal manner. The dose, dose schedule, and manner and form of administration may all be varied selectively in achieving optimal spawning behavior, with optimal hormonal treatment being readily empirically determined within the skill of the art. Preferably, GnRHa is administered in a sustained release form at a dose in a range of from about 25 to about 100 micrograms per kg body weight of females, and at a dose in a range of from about 15 to about 30 micrograms per kg of body weight of males.

Yet another aspect of the present invention relates to producing and harvesting soft shell crabs. Molting of crabs occurs many times through the life of the crab. Marine data suggests that there may be one or two peak molting periods during the years but not all individual crabs adhere to this schedule. At the time of molting, the crab backs out of the old shell and remains hidden for the next few days until the new shell hardens. It is known that capturing the early stage soft-shell crabs in baited traps is very difficult because of the natural instinct of the crabs to remain buried in sediment. More important, in many states there is requirement to release soft shell crabs that are trapped in the wild. Thus, the present invention provides for a system that includes harvesting of soft-shell crabs by monitoring of pre-molting crabs and segregation of them until shedding, at which time they can be removed from the tanks for marketing.

The same conditions noted above are applied for the production of soft shell crabs. Pre-molt crabs can be segregated and held in the cyclical cage system referenced above. Pre-molt crabs can be identified by a thin white, pink or red line on the inside edge of the swimming paddles. Water quality condition must be optimally maintained as discussed in Stickney (2000), the content of which is hereby incorporated herein by reference for all purposes.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The present invention relates to a recirculating marine aquaculture process for producing an optimal output of a crab species.

The process of the invention includes: (i) crab broodstock conditioning, (ii) spawning, (iii) egg incubation, (iv) larval growth, (v) nursery post-larval growth, and (vi) grow-out of crab to a final product weight, in a closed, recirculating aquaculture system in which photoperiod, water temperature, water chemistry (1) photoperiod, (2) water temperature, and (3) water chemistry (salinity, dissolved oxygen, ozone level, pH, etc.), and diet are optimized and then continuously monitored and controlled for the particular crab species, to obtain optimal production at each of the six phases (i)–(vi) of the life cycle.

The process of the invention, as a result of its low waste production characteristics and its amenability to use of municipal water as a source of aqueous media for marine aquaculture processing, permits commercial fish-farming operations to be conducted in urban environments and similar locations where deployment of aquaculture production facilities has heretofore not been commercially practicable.

The recirculated aquaculture system, while amenable to embodiment in various specific forms, typically comprises an assembly of tanks each containing an aqueous medium for a specific stage of the aquaculture process (broodstock conditioning, spawning, egg incubation, larval rearing, nursery rearing, and grow-out), with ancillary solids removal filters, biofilters having associated active microbial communities, oxygen (or oxygen-containing gas) sources, and automatic control unit(s) for monitoring and control of oxygen, salinity, temperature, photoexposure, pH and carbon dioxide in respective tanks of the aquaculture process system. The aquaculture process system may also include optional ancillary facilities, such as ozonation/disinfection units, foam fractionation (foam breaker or defoaming) units, brine generator units, automatic feeder units, biopsy facilities, harvesting/packaging facilities, etc.

The process of the present invention permits continuous culturing of a crab species in a high-rate growth operation to produce crab of market size in a compressed time-frame, relative to conventional marine-farming operations.

For example, the growth rate enhancement is concomitantly facilitated by a photoregime that in the grow-out phase substantially exceeds light exposure of the natural environment. By such light exposure regime, conditions are avoided that promote gonadal development. This in turn relates to a subtle facet of bioenergetics involving consumption and utilization of energy by the crab species. By utilizing a light exposure (photoexposure regime) that disfavors the gonadal development process, the process of the present invention avoids the dissipation of energy that would otherwise be expended in testicular and ovarian development of the crab, so that such energy instead is devoted to muscle/flesh development and weight-gain of the crab.

As another example, when culturing crab species in accordance with the invention, it has unexpectedly been found that the salinity of the aqueous medium in the grow-out phase can be reduced below the levels that are characteristic of the natural marine environment of such crab, without adverse effect on the growth and development of the crab. In fact crab raised in such lower salinity synthetic environments unexpectedly grow substantially faster than their counterparts raised in seapens or other environments that embody or mimic the natural marine environment of the species.

Further, such improvements have been found to be achievable with a synthetic brine derived from a chlorinated municipal water starting material that is de-chlorinated, e.g., by contact with activated carbon, and then employed to synthesize a low salinity aqueous medium, by addition to the de-chlorinated aqueous medium of suitable salts, minerals and trace element species, e.g., NaCl, KCl, Mg, Sr, Li, etc.

One such aqueous medium usefully employed in the practice of the invention comprises the composition identified in Table B below, wherein the components, purity, concentration, weight added, and percentage by weight (based on the total weight of the composition, exclusive of the top-off filtered freshwater) are as specified.

TABLE B

AQUEOUS MEDIUM COMPOSITION FOR AQUACULTURE SYSTEM

| Chemical Reagent | Purity | Conc. (g/L) | Amount (kg) | % by weight, based on total weight |
|---|---|---|---|---|
| Magnesium Chloride | 95.0% | 6.8900 | 54.184 | 20.02% |
| Calcium Chloride | 80.0% | 1.2597 | 11.764 | 4.35% |
| Potassium Chloride, (potash, fine) | 99.9% | 0.6552 | 4.900 | 1.81% |
| Strontium Chloride | 100.0% | 0.0150 | 0.112 | 0.04% |
| Lithium Chloride | 99.0% | 0.0011 | 0.00830 | 0.00% |
| Sodium Sulfate, (Anhydrous) | 100.0% | 2.5302 | 18.903 | 6.98% |
| Magnesium Sulfate, (Epsom salts) | 100% | 1.8704 | 13.974 | 5.16% |
| Sodium tetraborate, (Borax) | 100.0% | 0.0399 | 0.298 | 0.11% |
| Sodium molybdate | 99.0% | 0.000013 | 0.000097 | 0.00% |
| Sodium Carbonate, (soda ash) | 100.0% | 0.0600 | 0.448 | 0.17% |
| Sodium Bicarbonate, (baking soda) | 100.0% | 0.2300 | 1.718 | 0.63% |
| Sodium Chloride, saturated brine | 100.0% | 21.9980 | 164.345 | 60.72% |
| Top off with filtered freshwater to volume total amount | | | 270.65 | 100.00% |

The above-tabulated composition specifies the ingredients for an illustratively sized batch of the aqueous medium useful in the process of the present invention. The salinity of such aqueous medium may be modulated as desired, by the amount of filtered freshwater that is introduced during formulation of the aqueous medium composition.

In one aspect of the present invention, wherein crabs are being cultured, the aqueous medium in at least the grow-out phase may comprise a "hyposaline" aqueous medium. As used herein, the term "hyposaline aqueous medium" refers to an aqueous medium having a salinity that is in a range of from about 15 to about 30 parts per thousand (ppt). Such hyposaline aqueous medium therefore has a salinity that is below the salinity of natural oceanic marine waters (typically at least 30 ppt and usually about 33 to 35 ppt) to which the crab is native.

The foregoing aspects of the invention relating to the water source and the aqueous medium made therefrom evidence a number of unexpected facets.

It is highly surprising that a synthetic lower salinity aqueous medium would be conducive to an enhanced rate of growth of crab, since it is anticipated that the aqueous medium most conducive to high rate growth of crab would be the marine environment to which the crab have become evolutionarily adapted, namely, their natural (higher) salinity marine environment.

While we do not wish to be bound by any theory or hypothesis as to the reason for the enhanced growth rate of crab in such synthetic lower salinity environments, the observed phenomena may be susceptible to bioenergetic explanation. In a high salinity environment such as the ocean, marine species require physiological energy to accommodate ion channel transport and maintain internal osmotic stability relative to ionic (salt, mineral) species in the marine environment. By using a lower salinity aqueous medium in the grow-out phase, the energy requirements otherwise associated with such ionic transport and maintenance of osmotic stability are lessened, with correlative increase in the level of biological energy that is available for cellular and muscular growth.

In addition to the above, the recirculating aquaculture medium at volumetric turn-over flow rates, e.g., in a range of from about 0.5 to about 5 tank volumes/day, as contemplated in a preferred aspect of the invention, serves to prevent or at least minimize occurrence of anaerobiasis in the biofilter that preferably is associated with the aquaculture grow-out tank. Recirculating the aqueous medium increases the mass transfer gradient for dissolution of oxygen in the aqueous medium, so that oxygenation of the aqueous medium is enhanced in efficiency. Further, the contact of the aqueous medium with the microbial flora in the biofilter allows efficient removal of ammonia.

Dissolved oxygen (DO) refers to the volume of oxygen that is contained in the water. The amount of oxygen that can be held by the water depends on the water temperature, salinity, and pressure. Thus, the temperature of the water will determine the amount of dissolved oxygen and saturation occurs faster at warmer temperatures. If the water becomes to warm, even if 100% saturated, $O_2$ levels may be suboptimal for survival of the crabs. As such, an 80% to 100% saturation level will preferably include at least 5.00 mg $O_2$/L at 25° C. or at least about 5 ppm at 22° C.

The recirculated marine aquaculture process system including broodstock conditioning, spawning, egg incubation, larval rearing, nursery processing, and grow-out tanks, and ancillary feed, waste treatment/disposal, and monitoring/support facilities, may be housed in a dedicated building or other structure. The ability of the process to utilize municipal water permits the aquaculture system to be sited in urban or suburban areas, where transportation and infrastructure costs for support of the facility are significantly lower than in other areas traditionally considered for fish-farming operations.

Further, the high volumetric efficiency of the aquaculture process and system of the invention, and its low rate of net waste production (which is of a volume and character accommodating on-site treatment for effluent discharge), enable the aquaculture facility to be sited even in areas having strict environmental impact constraints.

In the grow-out phase, high growth rate is achieved, using high-rate feeding, extended photoexposure, and high-rate intra-system flows (volumetric exchanges of the grow-out tank) of hyposaline aqueous medium. The hyposaline aqueous medium is readily made up from chlorinated municipal source water after de-chlorination thereof, e.g., by carbon filtration.

The tanks that are used to contain the aqueous medium in carrying out the process of the invention may be of any suitable type, preferably being constructed of a corrosion-resistant material. The tanks may be covered to retard evaporation, or uncovered, as necessary or desirable in a given application of the invention.

The salinity of the aqueous medium in the tanks may be adjusted to the proper level using an electrochemical monitoring device such as a salinity probe and associated controls, or other of various suitable means known in the art for maintaining salinity at a desired value or within a predetermined operating range.

The tanks are provided as necessary with a photoexposure system. For example, a photoexposure light source such as a lamp may be associated with a process tank and coupled to a suitable power supply. The lighting system alternatively may comprise an arrangement of multiple lamps or illumination elements, e.g., mounted on the underside of a cover of a tank, or otherwise suspended in the tank headspace or above the tank, overlying the aqueous medium therein. The lighting system may be widely varied in make-up and operation, to provide a requisite light intensity, flux and other spectral characteristics, as suitable to the fish species being grown.

The power supply associated with the lighting system in turn may be coupled to a monitoring and control module for the aquaculture system, with electrical power supplied to light source element(s) according to a suitable cycle time program. The cycle time program may be stored in the memory of a central processing unit (CPU) of the monitoring and control module, to provide illumination of the contents of the tank as desired.

Such monitoring and control module may be arranged to variably control the light to which the contents of the tank are exposed, specifically regulating the light intensity and the length of the photoperiod (the period of light exposure).

The monitoring and control module may also be arranged to monitor and control other parameters of system operation, such as the water (aqueous medium) temperature, dissolved oxygen (DO) content of the water, pH of the water, feed (nutrient) dispensing, green water algal conditions, salinity, water flow rates into and out of the tank, etc., by appropriate coupling of the module with monitoring and control elements such as dissolved oxygen probes, thermocouples, pH sensors, flow monitors, flow control valves, salinity detectors, oxygen feed devices, acid/base dispensers, automated food dispensers, etc.

In operation of the aquaculture process system, aqueous medium may be pumped from the aquaculture tank by a system pump in a recirculation loop or flow circuit, for treatment outside the tank. For example, aqueous medium may be flowed from the tank to a filtration unit, such as a bead filter tank, in which suspended solids in the water are trapped by bead filtration media and removed from the aqueous medium.

Such filtration unit may for example be arranged to remove particulates having a particle size >20 microns. The bead filter is advantageously provided with electronic controls to effect periodic backflushing of the filter, e.g., cycle timer controls for backflushing at predetermined intervals, solids monitoring devices such as turbidity sensors, and/or other automated control means, the provision of which is within the skill of the applicable art.

The filtration unit removes sediment, and may have associated therewith a protein skimmer, to remove proteinaceous material floating to the top of the filtration tank.

In lieu of, or in addition to, bead filters, numerous other types of mechanical filters can be employed for solids removal, such as membrane filters, sedimentation chambers, clarifiers, centrifugal solids separators, filter presses, etc.

Upon completion of mechanical filtration, filtered water (filtrate) from the mechanical filter then may be flowed to a moving bed biofilter for nitrification under aerobic conditions, so that the ammonia ($NH_3$) or $NH_4^+$ present in the aqueous medium is converted to $NO_2$ and then to $NO_3$, with optional subsequent denitrification in a denitrification biofilter under anaerobic conditions. After optional denitrification, the aqueous medium can be re-oxygenated to provide a suitable level of dissolved oxygen therein, e.g., a concentration of at least 3 ppm, and preferably 3–7 ppm. The resultant treated water is recirculated to the aquaculture tank.

In the recirculation loop, water discharged from the filter can be selectively heated or cooled as necessary to maintain the aquaculture medium at a given temperature in the associated aquaculture tank. For example, such aqueous medium may be flowed to a heat exchanger, such as a shell-and-tube heat exchanger, in which the circulated aqueous medium is heated or cooled, as appropriate, by a heat exchange liquid, e.g., a glycol/water solution. The heat exchange liquid may be circulated through the passages of the heat exchanger from a source vessel, in which the liquid is maintained at a desired temperature, as necessary for the desired heat exchange heating or cooling of the aqueous medium.

In such manner, the water in the aquaculture tank can be maintained at a desired temperature appropriate to the specific fish species being grown in the process system.

In the recirculation flow circuit, a side stream loop may advantageously be provided, including a pump that is operated to flow the aqueous medium through a treatment unit in which dissolved organic species are removed by contact with ozone or oxygen. Such treatment unit optionally may be equipped with a protein skimmer, to remove floating proteinaceous matter from the surface of the liquid in the associated treatment unit tank(s). The treated water then may be flowed through a polishing chamber arranged for ion exchange, pH adjustment, and/or other treatment of the recycled aqueous medium, prior to its return to the aquaculture tank.

Overflow from any of the filters or tanks as well as waste solids from the filters in the aquaculture process system may be flowed to a waste tank where water and solids are treated with a disinfecting agent, such as chlorine or the like. The disinfected overflow/solids then may be discharged from the aquaculture system, e.g., into a municipal sewage system, aeration pond, or other receiving waters, for final disposition.

Any source of filtered fresh water may be used to supply fresh (or make-up) water for the aquaculture process, such as well water, or alternatively river water after appropriate sterilization. If the fresh water source is chlorinated municipal water, the water desirably is first treated to remove chlorine therefrom, e.g., by passage through a multi-sand medium and then activated carbon.

The aquaculture process facility may include fresh water and salt water storage for the aqueous medium used in the process. Salt water may be produced in the aquaculture facility using a brine generator, with trace mineral introduction and saltwater mixing in a mixing chamber, e.g., to form a saline aqueous medium at the salinity of natural seawater, or higher. The resultant saline aqueous medium then can be used in the process, at full strength or preferably, in diluted (hyposaline) form, as may be variously desired in the respective steps of the aquaculture process.

The aquaculture system may comprise appropriate flow circuitry in the form of pipes, conduits, manifolds, flow control valves, restricted flow orifice elements, valve actuators and controllers (which may be of any appropriate type, including elements such as pneumatic actuators, electromechanical actuators, solenoid valves, etc.) and the flow circuitry may include or be operatively coupled to a central controller unit or assembly.

In operation, the aqueous medium from the aquaculture tank preferably is circulated in a closed recirculation loop to an aqueous medium treatment complex (e.g., comprised of equipment such as bead filters, biofilters, ozonation units, protein skimmers, etc.) and recirculated to the aquaculture tank after treatment in the exterior recirculation loop.

In this manner, the process system is advantageously arranged to provide a desired volumetric turn-over frequency of the aqueous medium in the operation of the system, with flow from the aquaculture tank through the associated liquid recirculation loop and back to the aquaculture tank, with waste removal and make-up water addition as required. By appropriate arrangement of the recirculation loop and component pump(s), an appropriate turn-over rate of the aquaculture tank liquid volume may be effected for the specific operation being carried out in such tank. For example, the process can be operated to replenish the entire volume of water in the aquaculture tanks at a rate in a range of from about 0.5 to about 5 times a day, more preferably from about 1 to about 4 environment volume/day.

The liquid recirculation loop associated with the aquaculture tank desirably includes a biofilter, preferably containing microbial support media in a moving bed filter that is maintained in suspension in the tank liquid. Liquid circulation in the biofilter may be effected by diffusing air through a porous element, such as a rubber disk membrane, to cause the microbial support media to tumble and mix. The injection of gas and resultant gas-induced mixing provides increased contact between the microbial communities in the biofilter and the various dissolved metabolites. This in turn increases the cleansing action of the biofilter in treating the large volumes of water that are recirculated in the aquaculture system to achieve high efficiency operation.

Each aquaculture tank in the aquaculture process system preferably is computer monitored to control temperature, pH, dissolved oxygen, salinity, flow rates, light intensity and length of photoperiod at specific preferred optimal values or in specific optimal ranges, as appropriate to the particular aquaculture process and crab species involved. In the biofilters, monitoring advantageously is carried out to maintain microbial flora on the biofilter substrate elements in populations appropriate to high-rate purification of the aqueous medium in the recirculation loop.

For such purpose, appropriate sensing, monitoring and control elements may be interconnected with a CPU or other computer or automatic controller/monitoring unit, to provide an integrated monitoring and control module, e.g., for monitoring and controlling process parameters such as flow rates, photoexposure, dissolved oxygen concentration, temperature, pH, etc., and/or for effecting process operations, such as backwashing of system filters, filling/emptying of process tanks, dispensing of feed/nutrient material, actuating heating/cooling systems, etc.

In the broodstock conditioning tank of the process, the crab broodstock are conditioned for spawning and reproduction in an aqueous medium of appropriate temperature, population density, photoregime and salinity conditions. The crab broodstock in preparation for spawning may optionally be administered gonadotropin-releasing hormone (GNRH) or a gonadotropin-releasing hormone agonist (GnRHa) in a sustained released dose form, at an appropriate sex-adjusted dosage for the male and female broodstock.

In one embodiment of the aquaculture process of the invention, groups of crabs are advantageously "phase-shifted" in the years prior to spawning (i.e., the photoperiod, temperature and salinity regimes are manipulated so that the photoexposure for spawning is temporally shifted for staggered spawning seasons), to thereby enable year-round spawning.

After hatching/release from sponge, larvae are offered enriched rotifers (*B. rotundiformis*) enriched for 8 hr with n3/n6 enrichment media, and algae (a combination of Tetraselmis, Isochrysis and Nannochloropsis sp.), at a concentration of 40 rotifers/milliliter and 2.5 mg dry wt/L, respectively of the combined cocktail. The concentration of both rotifers and algae is maintained by continuous addition of both by hand. Continuous addition of rotifers via a continuous dispensing system (e.g., a gravity-based dispenser or dosing pump) can also be done. Once larvae become stage 3 zoea, the larvae are offered newly hatched Artemia nauplii in addition to rotifers. One day later, they are offered nauplii enriched for 16 hr with n3/n6 enrichment media (a total of 70–800 Artemia/L). When the larvae reach stage 8, they are counted and transferred to the nursery, where they are fed enriched adult Artemia. Optionally, these nauphil may be administered gonadotropin-releasing hormone (GNRH) or a gonadotropin-releasing hormone agonist (GnRHa) prior to feeding of same to the crab larvae.

Enriched diets of live foods for larval rearing may advantageously utilize various suitable types of live prey, e.g., brine shrimp, enriched with fatty acids. Green water conditions and enriched diets are beneficially employed to provide a balanced microenvironment and continuous food for the larvae.

The post-larvae are graded by size prior to being introduced to the nursery tank, and are weaned from their prior diet to a formulated microdiet, with food size being increased to match larval size.

In the nursery tank, lighting exposure is controlled to provide an appropriate photoregime for nursery growth of the crab species to a size suitable for the final grow-out process. In addition to controlling the light intensity and length of the photoperiod, monitoring and automatic control facilities desirably are employed to regulate temperature, dissolved oxygen content, pH and water flow rates in the nursery process.

The aqueous medium in the nursery process may be recirculated as previously described, in a recirculation flow circuit including filtration (mechanical and biological) means arranged to accommodate the high turnover volumetric flows in the nursery process.

The crabs are raised in the nursery tanks until they reach a predetermined size, and juveniles then are moved into large grow-out tanks.

In the grow-out tank, the crabs are grown from juveniles to market weight. The tanks in the grow-out process are suitably arranged with a lighting system and appropriate monitoring and control means to regulate light intensity and the length of the photoperiod, water temperature, dissolved oxygen concentration, pH and water flow rates.

The aqueous medium in the grow-out process may be recirculated in a flow circuit as previously described, being subjected to biological and mechanical filtration, removal of protein and dissolved organics, heating/cooling, etc.

In the entire process, electronic controls may be employed for back-flushing filters, for monitoring and controlling flow rates, dissolved oxygen concentration, temperature, pH, etc., using a microprocessor or computer system. Waste comprising overflow and solids sedimented or backwashed from the filters may be processed by disinfection and final discharge to sewer or other disposition or treatment, as previously described.

In optimal operation, the aquaculture process of the invention is conducted with less than 10% daily water exchange (daily water exchange meaning the water that is introduced to the aquaculture system as net make-up, and the water that is discharged from the system as net effluent to the waste disposal system). The aquaculture process system in such respect is a "closed" recirculating aquaculture system, since the net exchange of water with the external environment during normal operation of the system is extremely low. Such low level of net water consumption is enabled by the recirculated and continuously purified character of the water. The net waste generation is minimized, and net waste produced in the operation of the facility can be readily accommodated by local sewer, septic and wastewater treatment facilities.

It will be apparent to those skilled in the art that various modifications and variations can be made in the recirculating marine aquaculture process of the present invention without departing from the spirit or scope of the invention as hereinafter claimed. It will therefore be appreciated that numerous variations, modifications and other embodiments are contemplated, as being within the spirit and scope of the invention hereinafter claimed.

What is claimed is:

1. A closed, recirculating marine aquaculture process for production of a marine species, including life-cycle stages of (i) broodstock conditioning, (ii) spawning, (iii) egg incubation, (iv) larval growth, (v) nursery post-larval growth, and (vi) grow-out of the marine species to a final product weight, wherein each respective life-cycle stage (i)–(vi) of the process involves operation in an aqueous medium that is coupled in liquid recirculation relationship with means for removing waste components from the aqueous medium and returning purified aqueous medium to the external environment, and wherein photoperiod, water temperature, water chemistry, and diet are optimized and then continuously monitored and controlled for the specific marine species, to obtain optimal production at each of the six life-cycle stages (i)–(vi).

2. The process according to claim 1, wherein the marine species is a crustacean.

3. The process according to claim 2, wherein the crustacean is a crab.

4. A closed, recirculating marine aquaculture process for production of a crab species, including life-cycle stages of (i) broodstock conditioning, (ii) spawning, (iii) egg incubation, (iv) larval growth, (v) nursery post-larval growth, and (vi) grow-out of the crab species to a final product weight, wherein each respective life-cycle stage (i)–(vi) of the process involves operation in an aqueous medium that is coupled in liquid recirculation relationship with means for removing waste components from the aqueous medium and returning purified aqueous medium to the external environment, and wherein photoperiod, water temperature, water chemistry, and diet are optimized and then continuously monitored and controlled for the specific crab species, to obtain optimal production at each of the six life-cycle stages (i)–(vi).

5. The process of claim 4, wherein the crab species is selected from the group consisting of blue crab (*Callinectes sapidus*), Alaskan (red) King crab (*Paralithodes camtschatica*), Dungeness crab (*Cancer magister*), Jonah crab (*C. boresalis*), and the Rock crab (*C. irraoratus*).

6. The process of claim 4, including the steps of:

providing recirculated aqueous medium tanks for populations in the life-cycle stages;

continuously recirculating aqueous medium and treating the aqueous medium for removal of waste therefrom;

administering, as needed, gonadotropin-releasing hormone (GnRH) or GnRH agonist to a broodstock population of said crab prior to spawning; and maintaining process conditions in the aqueous medium in respective life-cycle stages, in accordance with the following PROCESS CONDITIONS correlative to LIFE-CYCLE STAGE:

| LIFE CYCLE STAGE | PROCESS CONDITIONS | |
|---|---|---|
| Broodstock conditioning | Salinity: | 15 ppt–35 ppt |
| | Temperature: | 15–25° C. |
| | Dissolved $O_2$ (DO): | 80% to 100% saturation |
| | ORP | 96–498 mV |
| | Population Density: | 4–7 crabs/meter$^2$ of tank bottom surface area |
| | Photoperiod and Thermal Regimes | simulated natural photoperiod and thermal regimes simulating natural environmental conditions |
| | Diet: | Crabs are fed 1–3 times daily with 2% per kg body weight, per day, of feed including protein and marine lipids |
| Spawning/ egg release | Salinity: | 20–35 ppt |
| | Temperature: | 15–25° C. |
| | Dissolved $O_2$ (DO): | 80%–100% saturation |
| | Population density: | 1 female/tank |
| | Photoperiod regime: | increasing days of 12–15 hours of light and –2 dark with transitions between light/dark periods of 45 minutes to 1 hour and 15 minutes; conditions culminate in photoperiod simulating natural spawning conditions of April–May. |
| Egg Incubation | Salinity: | 26–33 ppt |
| | Temperature: | 18–25° C. |
| | Dissolved $O_2$ (DO): | 80% to 100% saturation |
| | Photoperiod regime: | no photoperiod requirement |
| Larval crab rearing | Salinity: | 26–33 ppt |
| | Temperature: | 18–25° C. |
| | Dissolved $O_2$ (DO): | 80% to 100% saturation |
| | Population Density: | 30–175 larvae/liter |
| | Photoperiod regime: | simulated natural regime |

-continued

| LIFE CYCLE STAGE | PROCESS CONDITIONS | |
|---|---|---|
| | Diet and Green Water Environment: | enriched rotifers followed by enriched artemia |
| Nursery | Salinity: | 12–30 ppt |
| | Temperature: | 15–28° C. |
| | Dissolved O$_2$ (DO): | 80% to 100% saturation (optimal 100%) |
| | Population density | 4–10 post-larvae/liter, estimated maximum density of 6000 individuals per cubic meter volume |
| | Photoperiod regime: | light exposure simulative of a natural wild environment. |
| | Diet: | early stage of Artemia through adult stages of Artemia |
| Grow-out | Salinity: | 20–30 ppt |
| | Temperature: | 10–30° C. |
| | Dissolved O$_2$ (DO): | 80% to 100% saturation |
| | Population density: | 400–800 juveniles per 200 liter tank |
| | Water exchange: | about 0.5 to about 5 environment volumes/day |
| | Photoperiod regime: | 15–17 hours of light per day |
| | Feeding: | 1–3 times/day of pelleted commercial diet, with crab fed a percentage of their body weight with the percentage of feed decreases as crabs increase in size |
| | pH: | 7.4–7.8 |

7. The process of claim 6, wherein the crab species is Blue crab.

8. The process of claim 6, wherein in said broodstock conditioning stage, said feed comprises food selected from the group consisting of (i) squid meal-based dry pellets, comprising 50–55% protein and 10–15% marine-type lipids, wherein said lipids comprise at least 5% n-3 highly unsaturated fatty acids (HUFA), mainly of the 22:6n-3 (DHA) type, (ii) dry commercial pellets, (iii) 50% chopped squid and 50% pelleted diet designed for bottom feeder.

9. The process of claim 6, wherein photoperiod, temperature and salinity are manipulated to yield year-round egg production.

10. The process of claim 6, wherein spawning is initiated by treating females with gonadotropin-releasing hormone agonist (GnRHa) delivery systems.

11. The process of claim 10, wherein GnRHa is administered in a sustained release form at a dose in a range of from about 25 to about 100 micrograms per kg body weight of females, and at a dose in a range of from about 15 to about 30 micrograms per kg of body weight of males.

12. The process of claim 6, wherein the salinity of the aqueous medium in the broodstock conditioning tank is about 30 ppt.

13. The process of claim 6, wherein the salinity of the aqueous medium in the grow-out tank is in a range of from about 28 to about 30 ppt.

14. The process of claim 6, wherein a pre-molt crab from the broodstock or grow-up stock is segregated and monitored until shedding.

15. The process of claim 14, wherein the pre-molt crab is segregated in a cyclical cage system.

16. A process for producing a crab species, by cultivation in life-cycle stages including broodstock conditioning, spawning, egg incubation, larval rearing, nursery processing, and grow-out, in a closed, continuous recirculation aquaculture system adapted to culture corresponding populations of broodstock, eggs, larvae, crab in aqueous media, wherein photoperiod, water temperature, water chemistry, and diet are optimally maintained in the life-cycle stages to achieve optimal production in such life-cycle stages.

17. A process for producing a crab species in a closed, recirculating aquaculture system including respective aqueous medium-containing tanks for successive life-cycle stages, including broodstock conditioning, spawning, egg incubation, larval rearing, nursery processing and crab grow-out, wherein photoperiod, water temperature, water chemistry and diet are monitored and controlled to provide regulated process conditions in the aqueous medium tanks including the with the following PROCESS CONDITIONS correlative to LIFE-CYCLE STAGE:

| LIFE CYCLE STAGE | PROCESS CONDITIONS | |
|---|---|---|
| Broodstock conditioning | Salinity: | 15 ppt–35 ppt |
| | Temperature: | 15–25° C. |
| | Dissolved O$_2$ (DO): | 80% to 100% saturation |
| | ORP | 96–498 mV |
| | Population Density: | 4–7 crabs/meter of tank bottom surface area |
| | Photoperiod and Thermal Regimes | simulated natural photoperiod and thermal regimes simulating natural environmental conditions |
| | Diet: | Crabs are fed 1–3 times daily with 2% per kg body weight, per day, of feed including protein and marine lipids |
| Spawning/ egg release | Salinity: | 20–35 ppt |
| | Temperature: | 15–25° C. |
| | Dissolved O$_2$ (DO): | 80%–100% saturation |
| | Population density: | 1 female/tank |
| | Photoperiod regime: | increasing days of 12–15 hours of light and –2 dark with transitions between light/dark periods of 45 minutes to 1 hour and 15 minutes; conditions culminate in photoperiod simulating natural spawning conditions of April–May. |
| Egg Incubation | Salinity: | 26–33 ppt |
| | Temperature: | 18–25° C. |
| | Dissolved O$_2$ (DO): | 80% to 100% saturation |
| | Photoperiod regime: | no photoperiod requirement |
| Larval crab rearing | Salinity: | 26–33 ppt |
| | Temperature: | 18–25° C. |
| | Dissolved O$_2$ (DO): | 80% to 100% saturation |
| | Population Density: | 30–175 larvae/liter |
| | Photoperiod regime: | simulated natural regime |
| | Diet and Green Water Environment: | enriched rotifers followed by enriched artemia |
| Nursery | Salinity: | 12–30 ppt |
| | Temperature: | 15–28° C. |
| | Dissolved O$_2$ (DO): | 80% to 100% saturation (optimal 100%) |
| | Population density | 4–10 post-larvae/liter, estimated maximum density of 6000 individuals per cubic meter volume |
| | Photoperiod regime: | light exposure simulative of a natural wild environment. |
| | Diet: | early stage of Artemia through adult stages of Artemia |

-continued

| LIFE CYCLE STAGE | PROCESS CONDITIONS | |
|---|---|---|
| Grow-out | Salinity: | 20–30 ppt |
| | Temperature: | 10–30° C. |
| | Dissolved O$_2$ (DO): | 80% to 100% saturation |
| | Population density: | 400–800 juveniles per 200 liter tank |
| | Water exchange: | about 0.5 to about 5 environment volumes/day |
| | Photoperiod regime: | 15–17 hours of light per day |
| | Feeding: | 1–3 times/day of pelleted commercial diet, with crab fed a percentage of their body weight with the percentage of feed decreases as crabs increase in size |
| | pH: | 7.4–7.8 |

18. A process of producing a crab species in a recirculating aquaculture system comprising:
  (i) providing respective aqueous medium-containing tanks for successive life-cycle stages of the crab species including broodstock conditioning, spawning, egg incubation, larval rearing, nursery processing, and crab grow-out; and
  (ii) providing filtration means coupled in closed loop aqueous medium recirculation relationship with the respective tanks, so that aqueous medium from a tank is filtered for purification thereof and returned to the tank, wherein growth conditions are maintained in each of the respective tanks by the steps of:
    (a) administering nutritive material to each of the respective tanks containing crab or crab precursor feeding species;
    (b) maintaining salinity, dissolved oxygen, pH, temperature and photoexposure within predetermined ranges in each of the respective tanks;
    (c) utilizing a hyposaline aqueous medium as the aqueous medium in the grow-out tank; and
    (d) administering, as needed, gonadotropin-releasing hormone (GNRH) or GNRH agonist (GnRHa) to the crab species in a sustained release form prior to spawning of the crab in the spawning tank.

* * * * *

UNITED STATES PATENT AND TRADEMARK OFFICE
CERTIFICATE OF CORRECTION

PATENT NO. : 6,584,935 B2  
DATED : July 1, 2003  
INVENTOR(S) : Zohar et al.

It is certified that error appears in the above-identified patent and that said Letters Patent is hereby corrected as shown below:

Column 6,  
Line 4, "gonadotropin H" should be -- gonadotropin II --  
Line 35, "GNRH" should be -- GnRH --

Column 7,  
Line 44, "GNRH" should be -- GnRH --

Column 10,  
Line 59, Table A: after "in addition" insert -- to --  
Line 63, Table A: "age 8" should be -- stage 8 --

Column 20,  
Lines 11 and 39, "GNRH" should be -- GnRH --  
Line 38, "nauphil" should be -- nauphii --

Column 24,  
Line 27, "crabs/meter" should be -- crabs/meter$^2$ --

Column 26,  
Line 19, "GNRH" should be -- GnRH --

Signed and Sealed this

Fourteenth Day of October, 2003

JAMES E. ROGAN  
*Director of the United States Patent and Trademark Office*